United States Patent Office 2,876,181
Patented Mar. 3, 1959

2,876,181

PRODUCTION OF SODIUM

James M. Wood, Jr., Baton Rouge, La., assignor to Ethyl Corporation, New York, N. Y., a corporation of Delaware No Drawing. Application October 17, 1956
Serial No. 616,395

3 Claims. (Cl. 204—68)

The present process is concerned with the production of sodium by fused salt electrolysis.

The production of metallic sodium by electrolysis has been known for over 30 years. Early work dealt with the electrolysis of sodium chloride per se. Finding, among other disadvantages, that this process was objectionable because of the operating temperatures required and the low conductivity of the sodium chloride, various workers suggested that mixtures of salts be employed. After much investigation, the most efficient and practical mixture found was that of sodium chloride and calcium chloride in essentially equimolar proportions. Accordingly, such a mixture has been employed commercially for the past 30 years. The electrolysis is conducted, predominantly, in a cell which is basically that devised by Downs and described in U. S. Patent 1,501,756. Although the process has been used commercially for a long period and, in general, is considered satisfactory it does have some disadvantages. For example, the conductivity of the sodium chloride-calcium chloride melt is low resulting in the formation of heat which must be dissipated. Also the production is low for a given cell size even when operating under optimum conditions. Production can be enhanced by increasing the power to the cell but in this instance the excessive power increases the heat load so as to require additional cooling for heat dissipation. Still further, calcium is formed under the present and practical modes of operation as a solid. This presents particular handling difficulties. Specifically, solid calcium and calcium in solution in the sodium enters the riser pipe and is trapped by cooling with various devices and returned to the cell by mechanical disengagement from the cooling surfaces. Such disengagement, necessarily, is performed at frequent intervals during the cell operation. This adds additional expense to the cost of production. Likewise, since considerable amounts of the calcium are in the solid form they plate out on the cathode eventually forming a calcium sludge which gradually bridges over to the diaphragm. This causes shorting or reduces the current efficiency by the more rapid recombination of sodium and chlorine. It is, therefore, highly desirable to the industry to overcome the above and other disadvantages of the present commercial process and to provide a more efficient method of production of sodium.

Accordingly, it is an object of this invention to provide a novel process for the production of sodium. An additional object is to provide an improved and more economical process for the production of sodium by an electrolytic procedure. A still further object of this invention is to provide a process which gives greater production of sodium than the present commercial process while still being more economical and requiring less power consumption.

The above and other objects of this invention are accomplished by passing an electric current through a mixture comprising a sodium halide and a lithium halide. In general, the mixture of the halides is such that the lithium halide is present in molar amounts between about 30 to 95 percent. Surprisingly, rather than produce the expected lithium-rich mixtures at the cathode it is found that sodium is produced in predominant amounts by weight. In general, the temperature employed is above the melting point of the particular mixture to be electrolyzed. In a particularly preferred embodiment, a mixture of sodium chloride and lithium chloride wherein the lithium chloride is present in the amount between 70 to 80 mole percent electrolyzed at between about 560° to 650° C. has been found most effective. Depending upon the proportion of the lithium halide present in the melt, the amount of lithium produced in admixture with sodium at the cathode will vary somewhat proportionately. However, in a still further embodiment of this invention purer sodium is recovered by simply cooling the product produced at the cathode after transmittal to a receiving vessel. Generally, the product is cooled to a temperature between about 200° to 300° C. The molten lithium concentrates in the upper liquid portion with the sodium concentrating in the lower portion. The sodium is withdrawn from the bottom and the lithium is withdrawn near the top of the liquid level for recycling to the electrolysis cell where it reacts to form lithium chloride or for use as obtained.

There are many advantages achieved according to the process of this invention over the present commercial method of producing sodium. In particular, for the same rate of production of the sodium, a saving of at least 15 percent power requirement is achieved. Likewise, for a given cell capacity, production of sodium according to the present process can be increased 40 percent and higher over that employing the standard sodium chloride-calcium chloride mixture of the present commercial process by increasing the current but with the same heat load and voltage. Such is significant since when operating under the present commercial process the same cannot be achieved without increasing the voltage required. Therefore, the present process results in considerable saving on an annual production schedule since greater production in a given cell size can be achieved without increasing the power requirements. Another particular advantage of the process of this invention is that no solid metal is produced. Therefore, more effective recovery of the sodium is possible. More particularly the problem of bridging between the electrodes, especially as experienced in the present commercial process, is eliminated and the frequency of dismantling operations substantially decreased thus permitting longer cycle of operation of a particular cell.

The mixture electrolyzed is a mixture comprising sodium halides and lithium halides. In general, any of the halides of these metals can be employed, i. e., the chlorides, bromides, iodides, and fluorides. The chlorides and fluorides are generally employed rather than the iodides and bromides since the latter are more difficult to handle and not as practical. The chlorides are especially preferred because of their ready availability and economy. It is not necessary that the sodium halide correspond to the lithium halide, that is, a mixture of sodium chloride and lithium bromide can be electrolyzed. However, from a practical standpoint with relation to the recovery of the gases produced, it is preferred to employ the same halide of each metal.

In general, the electrolyte mixture can contain between about 30 to 95 percent on a molar basis of the lithium halide. Employing more than 95 mole percent of the lithium halide is not desirable since the amount of lithium produced in admixture with sodium, although being less than 50 weight percent, is still too abundant for practical and economical operation. Likewise, it is not desirable to employ less than 30 mole percent of the lithium halide since higher temperatures are required and below this amount the conductivity of the melt decreases. In a particularly preferred embodiment, the molar proportion of the lithium halide, particularly lithium chloride, is between about 70 to 80 percent. This range is especially preferred since it results in a combination of particular operational advantages. Specifically, this range provides the optimum conductivity, lowest operating temperatures, a minimum of over-voltage, and allows sufficient sodium chloride to be present to maintain a uniform bath composition.

Many types of electrolytic cells and procedures can be employed in conducting the process of the present invention. In general, the basic requirements are a suitable vessel for containing the electrolyte having an anode and cathode positioned therein and being enclosed but having a means for supplying electrolyte thereto, recovery of the gas formed, recovery of the metal formed, and, where necessary, a receiving and separating chamber for separation of the sodium from the lithium by gravitation or other suitable procedure. A particularly efficient and preferred cell is that which is basically the Downs cell described in U. S. 1,501,756. Briefly, this cell consists of a cylindrical steel shell, lined with refractory ceramic material, to form a container for the electrolyte. In the center of this container is mounted a graphite anode, which extends through the floor of the cell. Surrounding the anode is an annular steel cathode, with connections extending through the side walls of the cell. Located directly above the cathode is an annular structure, in the nature of an inverted trough, usually referred to as the "collector ring," which serves to collect molten light metal rising from the cathode. Suspended from the inner edge of the collector ring is a cylindrical, foraminous diaphragm, separating the space between the electrodes into anode and cathode compartments. At one point, a vertical outlet pipe, is connected to the top of the collector ring, this pipe serving to carry out the metal collected in the collector ring. This pipe leads into a receiver, which has an opening at the bottom, closed by a plug cock. At one side of the cell, at a point opposite the outlet pipe, is inserted a vertical pipe, the lower end of which opens into the lower part of the collector ring which transmits the gas produced from the cell. The receiver is modified to contain an outlet below the liquid level but above the interface between the lithium and sodium. The lithium during operation is continuously withdrawn for use or recirculated to the cell bath. The sodium being withdrawn continuously from the bottom of the receiver is essentially pure, normally above 96 weight percent.

To further illustrate the process of the present invention, the following examples are presented, wherein unless otherwise stated all parts are by weight. These examples are not intended to be in any way limiting but merely representative of the present invention.

*Example I*

The electrolysis cell employed comprises a U-tube having an inlet and outlet at each end for maintaining an inert atmosphere and a means for adding and removing materials which also supports an anode and cathode, respectively. Also provided is an external heating means. The cathode is provided with an inverted receptacle opening at the lower end for confining the product produced and for sample purposes. An initimate mixture of finely divided sodium chloride, 10 parts, and lithium chloride, 18.6 parts, is added to the U-tube in a dry box while simultaneously flushing with argon. The tube is externally heated to 580° C. and then the anode and cathode are inserted into each end of the U-tube. Current is then supplied so that the current density at the cathode is one amp./cm.$^2$. Electrolysis is conducted under these conditions for one hour. At the end of this period, the cathode is removed and cooled while still maintaining the argon atmosphere. It is found that one part of product is obtained analyzing 96 percent sodium and 4 percent lithium. This product can be employed as such or, if desired, the sodium is further purified by, for example, distillation at a reduced pressure of 350 mm. mercury to collect distilled grade sodium overhead.

In the following comparative examples, sufficient lithium and sodium halide salt was continuously added to maintain the designated molar proportions during each operation.

*Example II*

In this run the modified Downs cell described previously is employed. To the cell is added an intimate mixture of finely divided sodium chloride and lithium chloride, wherein 72 mole percent lithium chloride is present. The cell is externally cooled to 570° C., then 5.5 volts are supplied across the electrodes to result in a current density at the cathode of 1 amp./cm.$^2$. The cell is then operated continuously under these conditions. Shortly after applying the voltage to the system, the product receiver is maintained by external means at 250° C. with the lithium over-flow being returned continuously to the bottom of the cell. Additional electrolyte is supplied to maintain the liquid level in the cell and to balance the lithium recycled. The product sodium is continuously withdrawn from the bottom of the receiver. Per hour of operation, one part of sodium is produced having a purity of 95 weight percent.

The following example will demonstrate the results achieved according to the present commercial process and in contrast with the results obtained in the preceding example.

*Example III*

The electrolysis is conducted essentially the same as described in Example II with the exception that the electrolyte comprises a 50/50 mole percent mixture of sodium chloride and calcium chloride and the cell has, in the riser pipe, a means for condensing the calcium produced and mechanically discharging and returning it to the cell bath. In a series of runs, it is found that in order to achieve the same production of sodium as in Example II, of one part per hour, a total of 7 volts is required at the same current and current density, namely, 1 amp./cm.$^2$.

From the results obtained in Example III, it is seen that with the increased voltage required, nearly 22 percent more power is needed.

*Example IV*

Example II is repeated essentially as described with the exception that the current supplied is 1.4 amps. and the current density is 1.4 amps./cm.$^2$. In this instance, in one hour of operation 1.4 parts of sodium are produced without increasing the heat load or the voltage.

In contrast to the results obtained in the preceding example, the following example will demonstrate the deficiencies and disadvantages of the present commercial process which are overcome by the present invention.

*Example V*

Example III is repeated with the exception that the voltage is adjusted to produce 1.4 parts of sodium per hour. It is found that in order to achieve this production, 8.0 volts are required and additional cooling of 8.2 B. t. u.'s per hour is necessary.

As can be seen from comparing Examples II and IV, a 40 percent increase in production employing the same cell is obtained by the process of this invention by increasing the current and using the lithium chloride-sodium chloride cell bath but with the heat load and voltage remaining the same. In contrast, using the present commercial electrolysis mix and noting Examples III and V, the cooling requirements are increased and also the voltage when increasing the production to the same level. The molar proportions of the salts employed in the Examples II and IV, and Examples III and V are, to all intents and purposes, identical from the standpoint of having been established by experimentation that these particular mixes are the most practical and economical with regard to conductivity, temperature of operation, minimization of over-voltage and uniform bath composition.

*Example VI*

Example II is repeated essentially as described with the exception that the temperature is maintained at 650° C. and the melt comprises 90 mole percent lithium chloride, the remainder being sodium chloride. In this instance, the current density is 1.3 amps./cm.$^2$ and 1.3 parts per hour of 96 weight percent sodium is produced.

*Example VII*

The procedure of Example II is repeated with the exception that the melt is maintained at 600° C. and the lithium chloride is present in 30 mole percent. In this instance, the current density is 0.8 amp./cm.$^2$ and 0.8 part per hour of essentially pure sodium is obtained.

*Example VIII*

Similar results are obtained when operating according to Examples II, IV, VI or VII, employing lithium bromide and sodium bromide in place of lithium chloride and sodium chloride.

*Example IX*

When Examples II, IV, VI and VII are repeated with the exception that lithium iodide is substituted for lithium chloride and sodium iodide is substituted for sodium chloride, high purity sodium is produced in high yield.

*Example X*

High purity sodium is obtained in high yield when lithium fluoride is substituted for lithium chloride and sodium fluoride is substituted for sodim chloride in any of the Examples II, IV, VI and VII.

In the above examples, particularly Examples I, II, IV and VI through X, particular operating temperatures are set forth. In general, the temperature which can be employed is any temperature above the melting point of the mixture of salts and generally below its boiling point unless a slight pressure is applied to the cell. It is preferred to operate at temperatures between 560° to 650° C. Temperatures above 650° C. can be employed but are not preferred since the current efficiency will be diminished. Likewise, temperatures below about 560° C. are not employed since the mixtures will be solid and therefore inoperative. Accordingly, any of the aforementioned temperatures employed in the examples can be changed and the electrolysis operated at, for example, 560° C., 600° C., 625° C. or 640° C. to produce similar results.

Likewise, in conducting the electrolysis of this invention the current density at the anode can be varied over a wide range. In general, current densities between 0.2 to 3.0 amp./cm.$^2$ are satisfactory. Current densities below about 0.2 can be employed but are not economical since the electrolysis is slower. Likewise, current densities above about 3.0 amp./cm.$^2$ are not desirable since the gas film on the anode becomes excessive, resulting in greater resistivity and diminished production. For maximum output while obviating operating difficulties, such as the anode effect just mentioned, it is preferred to employ a current density between about 0.7 to 1.5 amp./cm.$^2$. Within this range most efficient and effective production is achieved. Generally, the cathode current density is approximately the same as the anode. However, they can be varied if desired. Therefore, efficient production of sodium can be achieved in the Examples I, II, IV and VI through X by operating at current densities of 0.2, 0.4, 1.5, 2.5 and 3.0 amp./cm.$^2$ in place of the current densities described in these examples. Although for most efficient operation, it is preferred that the current densities be maintained at 0.7 to 1.5 amp./cm.$^2$.

The purity of the salts employed in the melt is not critical. For example, they can be contaminated by other salts such as the salts of other metals as calcium, potassium, and the like, halides; or oxides of these and other metals, including lithium and sodium although in minor amounts, generally less than about 0.1 percent by weight. It is particularly preferred that the oxides contained in the melt be below about 0.02 weight percent in order to eliminate reduction in current efficiency. It is preferred that the total amount of these and other contaminants in the salt is below about 3 percent.

As noted in the examples, the cell is enclosed. Such operation is preferred to exclude moisture. Alternatively or in conjunction therewith a blanket of dry gas such as argon, helium, nitrogen and the like can be employed to prevent contamination. The electrodes can be the same or different and constructed of various materials such as carbon, iron, steel, nickel, etc. It is preferred to employ a carbon anode and an iron cathode.

The sodium is generally separated from the lithium by cooling the cathode product mix in the product receiver and separating the phases. In general, the temperature at which such cooling is accomplished is the temperature of minimum solubility with maximum separation of the two components, normally between about 190° to 350° C. For most effective and economical operation such cooling is accomplished at a temperature between about 200° to 300° C. Likewise, it is not necessary to return the separated lithium to the cell since it can be recovered and employed as such. Therefore, in the process of this invention two valuable products can be simultaneously produced without requiring further purification.

The preceding description sets forth the preferred methods of separating the cathode product into its respective sodium and lithium components. However, other means of separation of the sodium can be employed. In another embodiment of this invention essentially pure sodium is recovered by passing the product produced at the cathode after removal therefrom countercurrently through liquid sodium halide, generally at a temperature between about 850 to 1000° C. with pressure applied if desired. Thus, in this instance, in place of the receiver described previously there is employed a countercurrent extractor, or extractors in series. The molten metal product is countercurrently passed through the molten sodium halide to extract any lithium present. The lithium chloride-sodium chloride mixture obtained is generally returned to the cell. The sodium drawn continuously from the top of the extractor is essentially pure, normally above 99.9 percent.

The following example will demonstrate a particularly preferred mode of conducting this embodiment of the invention.

*Example XI*

Six steel containers are connected in series with the product discharge pipe of the cell so that the product passing from the cell and each container passes into the bottom of the next succeeding container. The salt composition passes countercurrently to the product and is introduced into the top of the last container, transmitted to each succeeding container and eventually to the cell. The containers are equipped with internal agitation and external heating means. Under steady-state operating conditions with each container maintained at 850° C. and containing mixtures of sodium chloride and the product metal, 21.7 parts per hour of liquid metal, e. g., containing 96 weight percent sodium, and 4 weight percent lithium is added to the first container and the metal continuously overflows from the first and intermediate containers to the last container. It is found that 23 parts per hour of metal containing 99.92 weight percent sodium and 0.08 weight percent lithium is withdrawn from the last container. During the operation, pure molten sodium chloride is added to the last container in the series at a rate of 58.5 parts per hour and the salt continuously overflows from the last container to the next and is ultimately withdrawn from the first container at the rate of 57.2 parts per hour. The salt withdrawn comprises 98.7 weight percent sodium chloride and 1.3 weight percent lithium chloride. The sodium metal withdrawn from the last container is suitable for manufacture of sodium-lead alloys. The salt withdrawn from the first container is used to replenish the salt phase in the sodium cell.

Although the preceding example describes sodium chloride as the extracting liquid, any of the halide salts of sodium can be employed, i. e., sodium bromide, sodium iodide, or soduim fluoride. It is preferred however to employ the same salt as is employed in the electrolysis cell.

In still another embodiment of the invention the product as obtained from the cathode of the cell can be further purified by distillation to result in distilled grade sodium. The following is a typical example of this mode of purification.

*Example XII*

A distillation tower having 2 trays and equipped with a condenser and mechanism for reflux is employed. The tower is insulated and heat is supplied to the lower tray. The reflux condenser is cooled to such an extent that it condenses metal vapors from the tower but does not solidify them. One sixth of the liquid condensate flows into the product receiver and the remainder is returned to the upper tray of the column in order to maintain the proper reflux ratio. The reflux condenser is maintained at one atmosphere pressure. Under steady-state conditions, supplying 21.7 parts per hour of a sodium-lithium metal mixture as obtained from the cathode of the cell containing 96 weight percent sodium is heated to its boiling point and fed to the top tray. An overhead product of 20.5 parts per hour of 99.95 weight percent sodium is collected along with 1.2 parts per hour of bottoms containing 54.1 weight percent sodium. The bottoms product is returned to the electrolytic cell where it reacts with the melt and results in increased production of sodium.

It will be evident that other similar techniques of distillation can be employed, for example, the distillation column can have a varied number of trays and the feed of the sodium-lithium mixture can be introduced at varying temperatures, preferably, however, above its melting point and at various locations in the column. The preceding example is intended only to reflect a preferred embodiment of this invention.

Still other methods of further purification of the metal product can be employed. Among such other methods of purification are included fractional crystallization and filtration, or reaction of the lithium with chemicals reacting preferentially therewith.

The present invention provides a novel and more economical process for the production of sodium. Sodium is of particular use at present in the formation of lead alloys which are employed in the production of tetraethyllead. Likewise, it can be employed in the production of high molecular weight alcohols by simultaneous reaction of the metal and an alcohol with the esters of vegetable fats and oils. Still further use will be evident to those skilled in the art.

Having thus described the process of the present invention, it is not intended that it be limited except as set forth in the following claims.

I claim:

1. A process for the production of a sodium product which comprises electrolyzing a fused mixture of lithium chloride and sodium chloride at a temperature between 560° to 650° C. and a current density between 0.7 to 1.5 amp./cm.$^2$, said lithium chloride being present in amount between 70 to 80 mole percent, and forming thereby a cathode product having a sodium content by weight substantially greater than the sodium to lithium proportion in the said fused mixture.

2. A process for the manufacture and purification of sodium comprising electrolyzing a fused mixture of lithium chloride and sodium chloride at a temperature of 560–650° C. and a current density of 0.7 to 1.5 amp./cm.$^2$, the said molten mixture containing from about 70 to 80 mole percent lithium chloride, thereby releasing a cathodic product comprising a solution of lithium and sodium metals and withdrawing said product, said product having a sodium content substantially higher in concentration than the sodium to lithium proportion in said fused mixture, then cooling the molten product to a temperature between about 200 to 300° C., whereby a bottom, sodium enriched, layer is produced, surmounted by a lithium rich layer, separating said layers and returning said lithium layer to the electrolysis step and withdrawing the sodium layer.

3. A process for the production of a sodium rich metal product which comprises electrolyzing a fused mixture of lithium chloride and sodium chloride at a temperature between 560° to 650° C. and a current density between 0.7 to 1.5 amp./cm.$^2$, the lithium chloride being present in said fused mixture in a concentration of from 70 to 80 mole percent, providing thereby a cathode product having a sodium content substantially higher in concentration than the sodium to lithium proportion in said fused mixture, and then further enriching said cathode product in sodium content by countercurrent contacting with molten sodium chloride, whereby the lithium content of the cathodic product reacts with said molten sodium chloride and releases additional sodium in the metal phase.

References Cited in the file of this patent

UNITED STATES PATENTS

| | | |
|---|---|---|
| 464,097 | Grabau | Dec. 1, 1891 |
| 778,270 | Roberts | Dec. 27, 1904 |
| 944,826 | Seward et al. | Dec. 28, 1909 |
| 1,116,865 | Acker | Nov. 10, 1914 |

FOREIGN PATENTS

| | | |
|---|---|---|
| 389,150 | Great Britain | Mar. 6, 1933 |
| 666,281 | Great Britain | Feb. 6, 1952 |

OTHER REFERENCES

Serial No. 340,402, Grothe (A. P. C.), published May 18, 1943.